United States Patent
Gostrer et al.

(10) Patent No.: US 8,659,440 B2
(45) Date of Patent: Feb. 25, 2014

(54) METER DISCONNECTION DETECTION SYSTEM AND METHOD

(75) Inventors: Alexander Gostrer, Sunnyvale, CA (US); Winston Lew, Sunnyvale, CA (US)

(73) Assignee: Silver Spring Networks, Inc., Redwood City, CA (US)

( * ) Notice: Subject to any disclaimer, the term of this patent is extended or adjusted under 35 U.S.C. 154(b) by 228 days.

(21) Appl. No.: 13/333,023

(22) Filed: Dec. 21, 2011

(65) Prior Publication Data
US 2013/0162436 A1  Jun. 27, 2013

(51) Int. Cl.
*G08B 21/00* (2006.01)

(52) U.S. Cl.
USPC ............. 340/635; 340/3.43; 340/538.14

(58) Field of Classification Search
USPC ............. 340/635, 637, 657, 3.43, 870.16; 702/58, 62, 64; 324/76.11
See application file for complete search history.

(56) References Cited

U.S. PATENT DOCUMENTS 7,583,202 B2 *  9/2009  Robinson et al. ......... 340/870.02
8,219,334 B2 *  7/2012  Robinson et al. ............... 702/64

* cited by examiner

*Primary Examiner* — Toan N Pham
(74) *Attorney, Agent, or Firm* — Patterson & Sheridan, LLP (57) ABSTRACT

Methods, systems, and devices for detecting when an end-device is physically disconnected from a commodity delivery network. One method includes determining an impedance of a power input of the end-device after the end-device experiences a power interruption, generating a message including data regarding the impedance, transmitting the message to a computer-implemented back office over at least one communication network, and automatically setting a status of the end-device to a physically-disconnected status when the data regarding the impedance indicates the impedance is greater than a threshold.

21 Claims, 5 Drawing Sheets

METER DISCONNECTION DETECTION SYSTEM AND METHOD

BACKGROUND

The present invention relates to commodity delivery networks and related devices, systems, and methods, and particularly to devices, systems, and methods for managing physical disconnections of such devices from a commodity delivery network.

SUMMARY

In one embodiment, the invention provides a computer-implemented method for managing an end-device connected to a commodity delivery network. The method includes determining, at the end-device, an impedance of a power input of the end-device after the end-device experiences a power interruption; generating, at the end-device, a message including data regarding the impedance; and transmitting the message to a computer-implemented back office over at least one communication network. The method also includes automatically setting a status of the end-device to a physically-disconnected status when the data regarding the impedance indicates the impedance is greater than a threshold.

In another embodiment, the invention provides a system for managing a commodity delivery network. The system includes a computer-implemented back office and an end-device. The end-device includes a back-up power source and at least one power input configured to be connected to the commodity delivery network. The end-device is configured to detect a power interruption and, using the back-up power source, determine an impedance of the power input and transmit a message including data regarding the impedance to the back office over at least one communication network. The back office is configured to receive the message and automatically set a status of the end-device to one of a physically-disconnected status and a physically-connected status based on the data regarding the impedance included in the message.

In another embodiment, the invention provides an end-device connected to a commodity delivery network. The end-device includes computer-readable medium containing instructions for managing the end-device and a processor for executing the instructions. The instructions include instructions for (i) detecting a power interruption, (ii) determining an impedance of a power input of the end-device, (iii) generating a message including data regarding the impedance of the power input, and (iv) transmitting the message over at least one communication network.

In yet another embodiment, the invention provides a back-office for managing a commodity delivery network. The back-office includes computer-readable medium containing instructions for managing an end-device connected to the commodity delivery network and a processor for executing the instructions. The instructions include instructions for (i) receiving a message over at least one communication network from the end-device when the end-device experiences a power interruption, the message including data regarding an impedance of a power input of the end-device and (ii) automatically setting a status of the end-device to a physically-disconnected status when the data regarding the impedance indicates the impedance is greater than a threshold.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
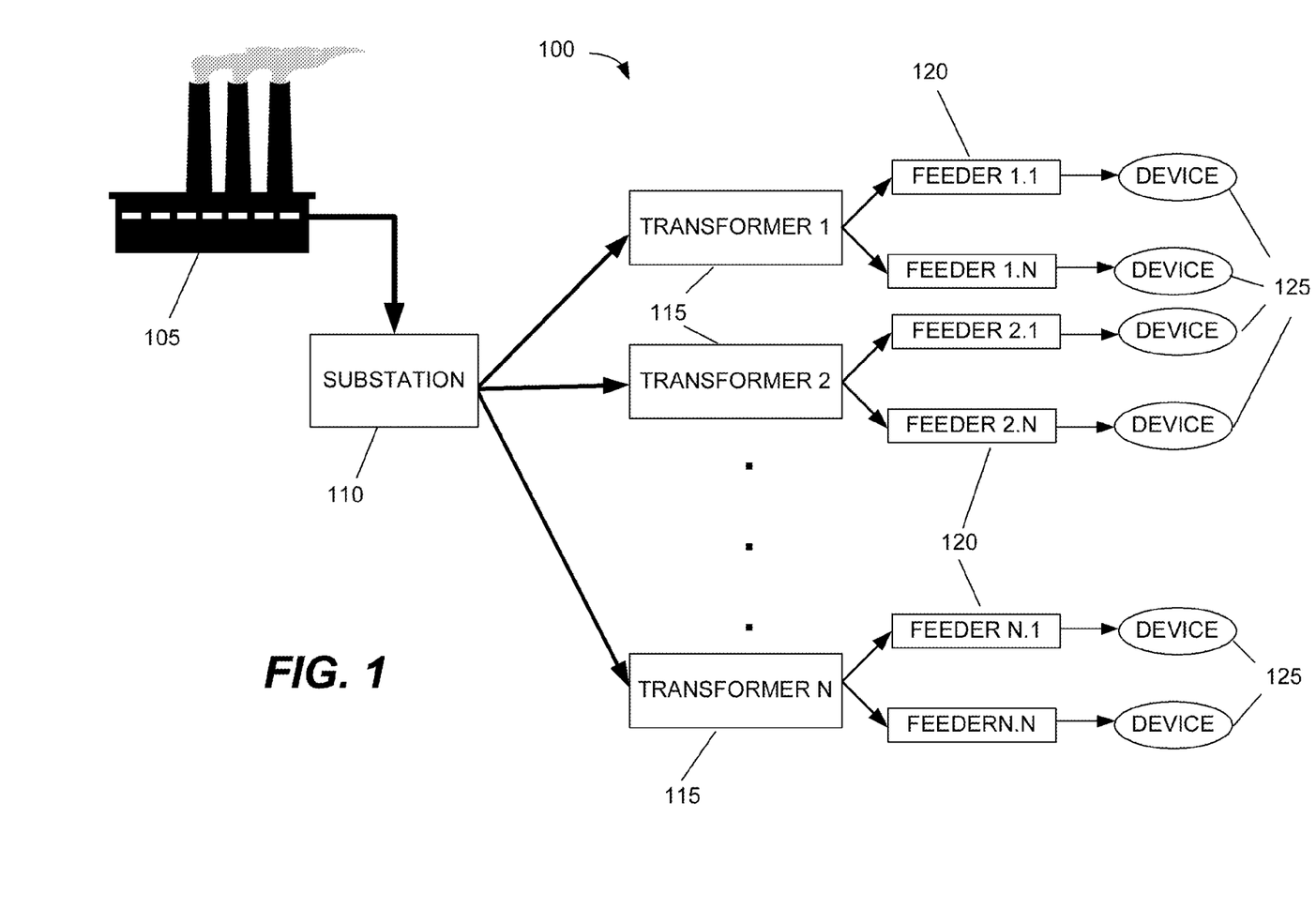
FIG. 1 is a schematic diagram of a commodity delivery network.

FIG. 1 shows an exemplary commodity delivery network 100. The commodity delivery network 100 in this example is for delivering electricity to end users (e.g., homes, businesses, etc.). The illustrated delivery network 100 includes a power generation plant 105, a plurality of substations 110 that receive high-voltage power from the power generation plant 105, a plurality of transformers 115, a plurality of feeders or laterals 120, and a plurality of end-devices 125 (e.g., a smart electric meter). The power generation plant 105 generates electricity and provides high-voltage power to the substations 110. The substations 110 step down the received voltage, and supply the stepped-down voltage to the transformers 115. The transformers 115 again step down the voltage and supply this voltage, via the feeders/laterals 120, to end-users (e.g., residential and commercial buildings) through the end-devices 125. The end-devices 125 monitor, and in some cases control, usage of the commodity by the end-users.

Figure 2:
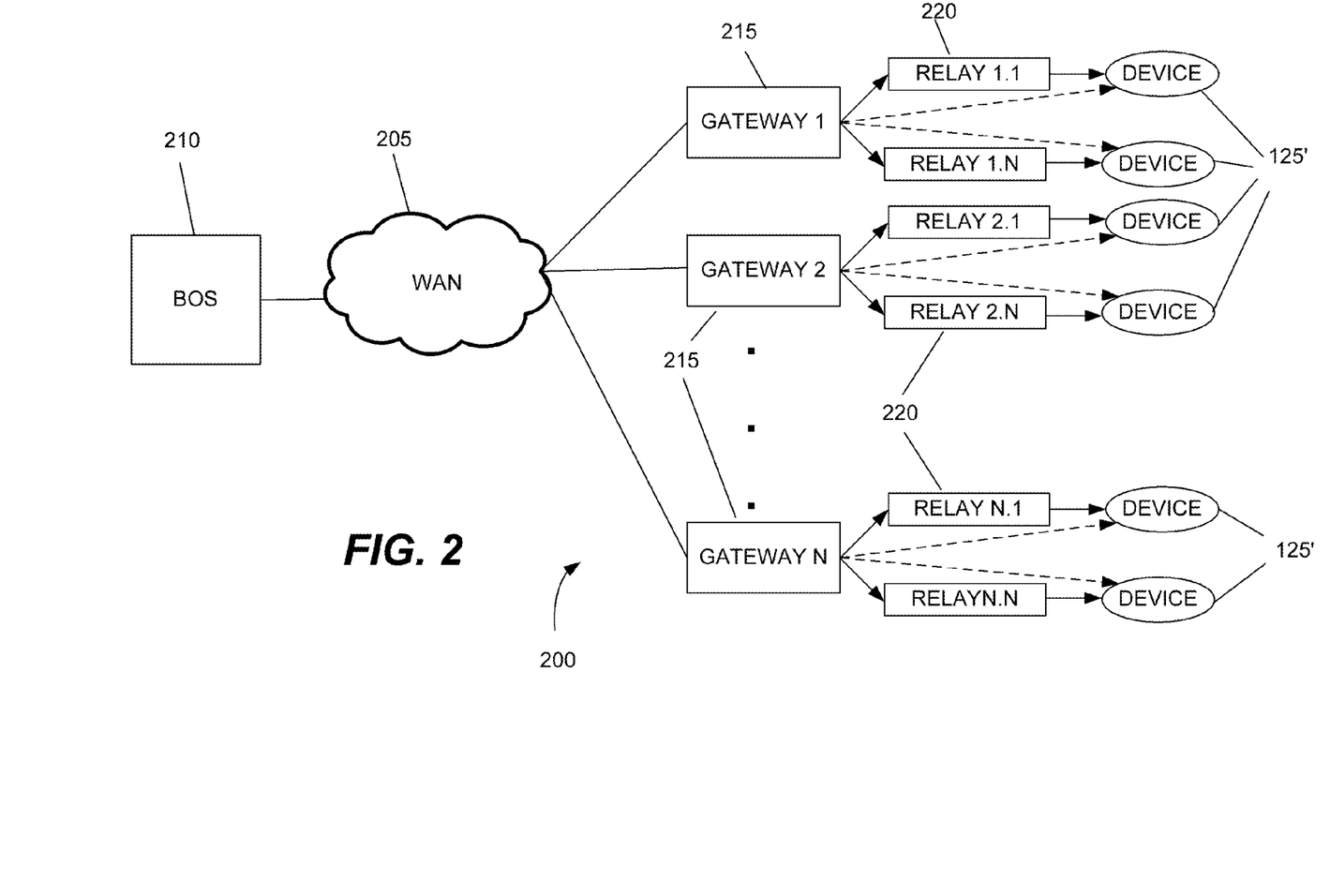
FIG. 2 is a schematic diagram of a communication network overlaid on the commodity delivery network of FIG. 1.

FIG. 2 shows an exemplary construction of the communication network 200 which overlays the delivery network 100 of FIG. 1. The communication network 200 enables communication between the commodity provider (e.g., the power generation plant 105) and the components of the delivery network 100 (e.g., the plurality of substations 110, the plurality of transformers 115, the plurality of feeders or laterals 120, and the plurality of end-devices 125). The communication network 200 can include a wide-area-network (WAN) 205, via which a computer-implemented back office 210 of the commodity provider communicates with a local-area-network (LAN). The LAN in the illustrated embodiment includes a plurality of gateways 215, a plurality of relays 220, and a plurality of end-devices 125'. The components of the delivery network 100 can perform one or more of the communication network 200 functions (e.g., the gateway 215, the relay 220, and the end-device 125' functions), or they can perform none of the communication network 200 functions. In addition, one or more of the gateways 215 and/or relays 220 can perform communication network functions but not any commodity delivery functions. In addition, one or more of the end-devices 125' can perform functions of the gateway 215 and/or the relay 220 and, in some embodiments, can perform any commodity delivery function.

U.S. Pat. No. 7,853,417 filed on May 17, 2007, and entitled "Methods and System for Utility Network Outage Detection," the entire contents of which are hereby incorporated by reference, describes operation of an exemplary communication network 200 in greater detail. In addition, the invention can be practiced using other communication network constructions. For example, U.S. patent application Ser. No. 12/510,168 filed on Jul. 27, 2009, and entitled "Meshed Networking of Access Points in a Utility Network," and U.S. patent application Ser. No. 12/167,592 filed on Jul. 3, 2008, and entitled "Network Utilities in Wireless Mesh Communications Networks," the entire contents of both being hereby incorporated by reference, disclose mesh communication networks for use in commodity delivery networks.

Figure 3:
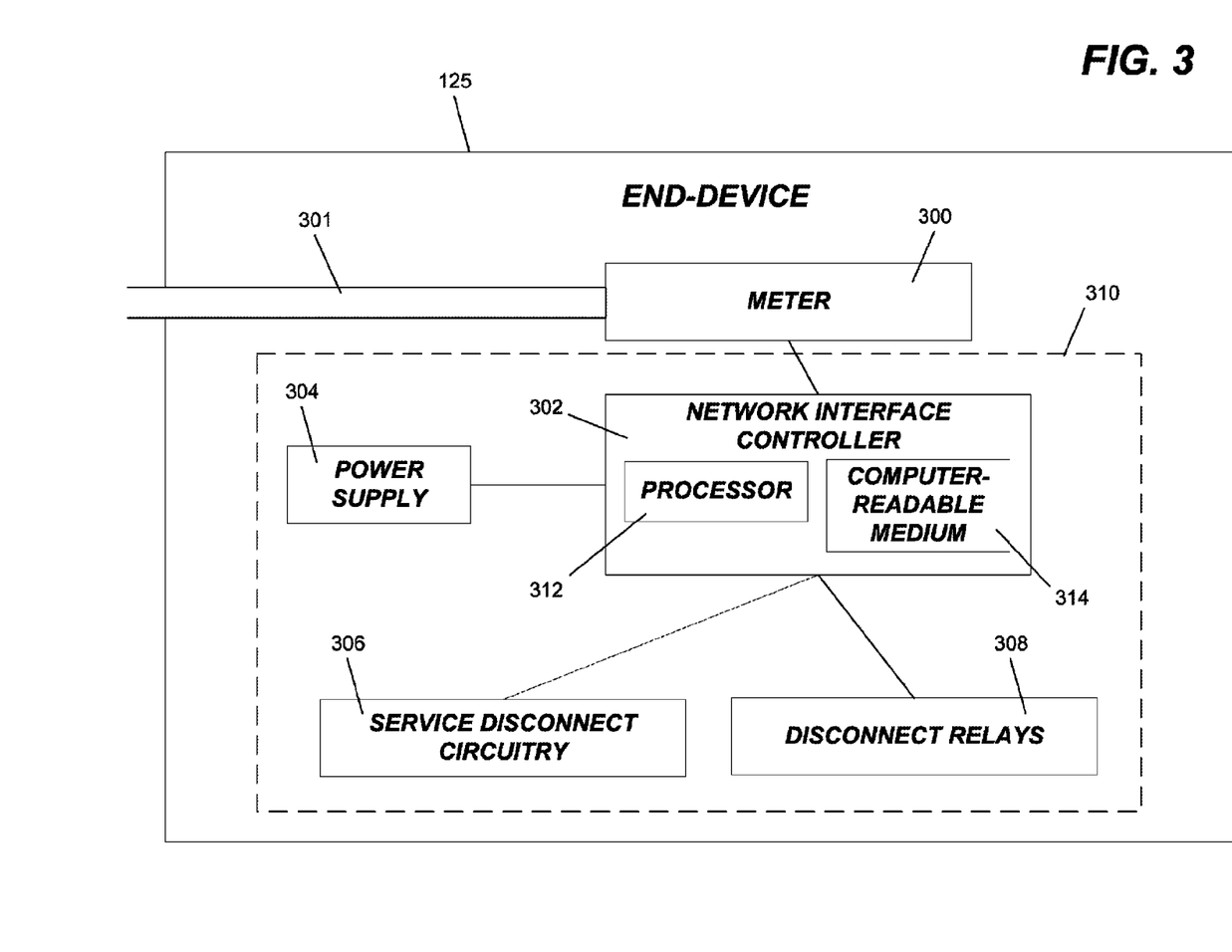
FIG. 3 is a schematic diagram of an end-device connected to the commodity delivery network of FIG. 1 and the communication network of FIG. 2.

FIG. 3 illustrates an end-device 125 according to some embodiments of the present invention. It should be understood that the end-device 125 can also represent an end-device 125' as illustrated in FIG. 2. In general, the end-device 125 can include components and functionality to connect with and interact with the commodity delivery network 100 and the communication network 200. Also, it should be understood that FIG. 3 illustrates only one example of components included in an end-device 125, and that other configurations are possible. As shown in FIG. 3, the end-device 125 includes a meter 300, a power input 301, a network interface card or controller ("NIC") 302, a power supply 304, service disconnect circuitry 306, and disconnect relays 308. The power input 301 connects the meter 300 to the commodity delivery network 100. The meter 300 monitors and, in some cases, controls the amount of the commodity (e.g., electricity) passing through the end-device 125 over the power input 301, which represents commodity usage of a particular end-user. In some embodiments, the meter 300 also includes a meter interface box 310 ("MIB") that houses the NIC 302, the power supply 304, the service disconnect circuitry 306, and the disconnect relays 308.

The power supply 304 in the illustrated embodiment of FIG. 3 supplies power to the NIC 302 and/or the meter 300. In some embodiments, the power supply 304 serves as a back-up power supply for the end-device 125 when electricity delivered over the commodity delivery network 100 is unavailable (e.g., during a power outage and/or when the end-device 125 is disconnected from the network 100). The back-up power supply can include a battery and/or a capacitor. As shown in FIG. 3, the NIC 302 can include a processor 312 and computer-readable medium 314. The computer-readable medium 314 of the illustrated embodiment includes non-transitory computer readable medium, and volatile memory, non-volatile memory, or a combination thereof. The computer-readable medium 314 stores instructions executable by the processor 312 to manage the end-device 125. For example, the instructions can include instructions for communicating with the meter 300 (e.g., collect data and issue commands) and communicating with other devices and systems over the communication network 200 (e.g., the back office 210). For example, the NIC 302 can be configured to collect data from the meter 300 (i.e., "read" the meter 300) continuously or at predetermined times (hereinafter referred to as "meter data") and transmit the meter data (either raw or after processing the data) over the communications network 200 to the back office 210. The commodity provider can use the meter data to charge an end-user based on their usage of the commodity. It should be understood that in some embodiments, the NIC 302 can communicate with a plurality of meters 300. For example, the NIC 302 can be located external to an end-device 125 and can communicate with a plurality of end-devices 125 and, subsequently, a plurality of meters 300. Alternatively, an end-device 125 can include multiple meters 300 and one or more NICs 302 for managing the meters 300.

The service disconnect circuitry 306 and the disconnect relays 308 illustrated in FIG. 3 allow the end-device 125 to be safely disconnected from the commodity delivery network 100 (i.e., stopping power supply to one or more end users) while still remaining physically connected to the network 100. For example, an end-device 125 can be "disconnected" from the network 100 to allow for maintenance or to discontinue supply of the commodity for a particular end-user (e.g., due to nonpayment of a commodity bill). In both of these situations, however, the end-device 125 remains physically connected to the network 100, which allows the end-device 125 to be "reconnected" to the network 100 at a later time. It should be understood that in some embodiments, the relays 308 can be included in the circuitry 306. Also, in some embodiments, the circuitry 306 and/or the relays 308 can be located external to an end-device 125 and can be used to disconnect a group of end-devices 125 from the network 100. Furthermore, in some embodiments, the service disconnect circuitry 306 and the disconnect relays 308 can also be used to connect the end-device 125 to the network 100. In other embodiments, the end-device 125 can include additional components to connect the end-device 125 to the network 100.

Figure 4:
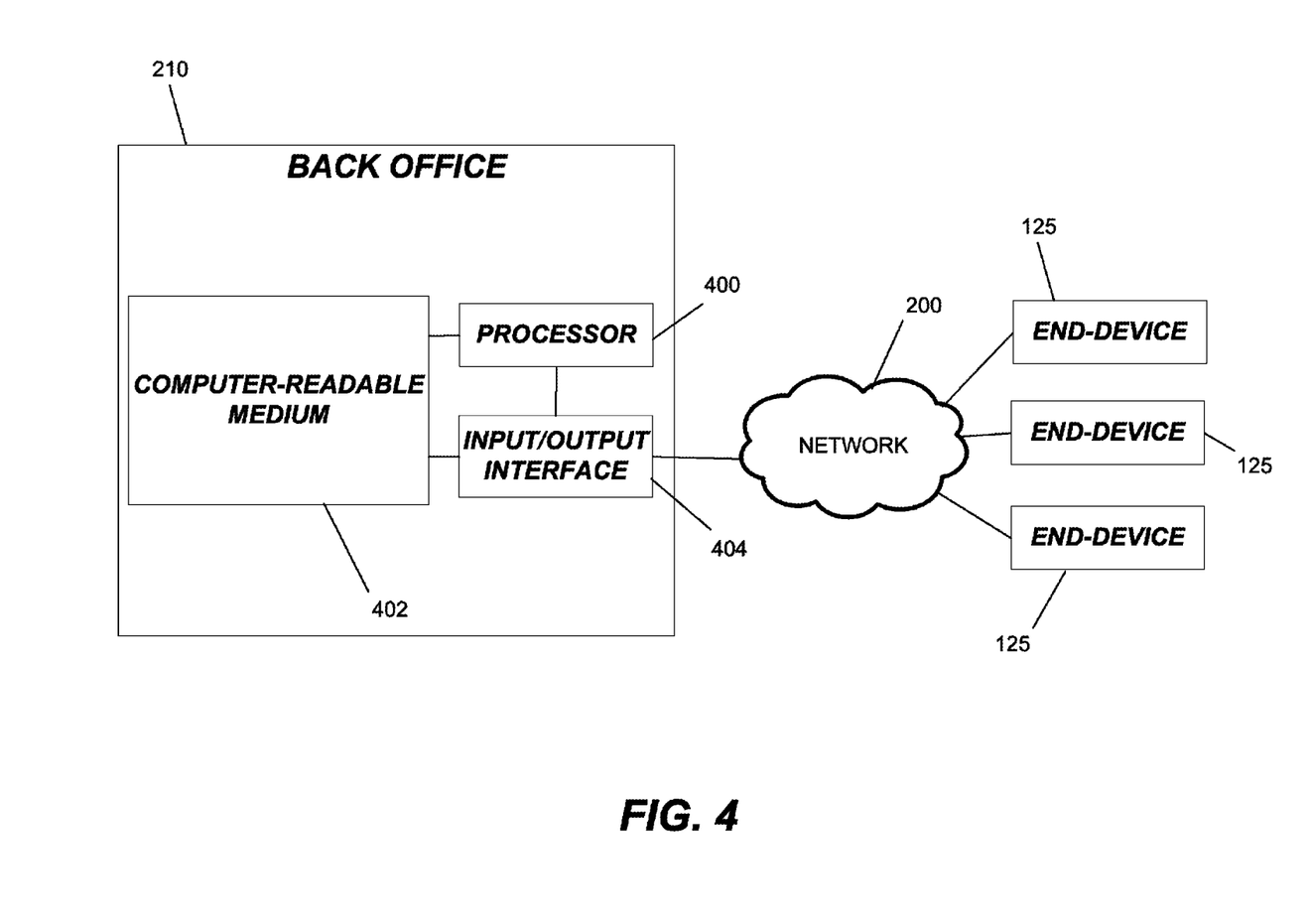
FIG. 4 is a schematic diagram of a back office connected to the communication network of FIG. 2.

FIG. 4 schematically illustrates the back office 210 according to some embodiments of the present invention. In general, the back office 210 can include components and functionality to connect with and interact with external devices and systems associated with the commodity delivery network 100 over the communication network 200. For example, as shown in FIG. 4, the back office 210 connects with a plurality of end-devices 125 over the communication network 200. It should be understood that FIG. 4 illustrates only one example of components included in the back office 210, and that other configurations are possible. As shown in FIG. 4, the back-office 210 includes a processor 400, computer-readable medium 402, and an input/output interface 404. The input/output interface 404 transmits data to and receives data from one or more external devices or systems, such as end-devices 125, over the communication network 200. The computer-readable medium 402 can include non-transitory computer readable medium and volatile memory, non-volatile memory, or a combination thereof. The computer-readable medium 402 stores instructions executable by the processor 400 to manage one or more end-devices 125. For example, the instructions can include instructions for receiving meter data from an end-device 125 that identifies usage of the commodity by an end-user associated with the end-device 125 and/or instructions for billing the end-user based on the usage. In addition, as described in more detail below, the instructions can include instructions for receiving messages from an end-device 125 and identifying a status of the end-device 125 based on the message. The instructions can also include instructions for scheduling maintenance for an end-device 125 based on the status of the device.

In operation, an end-device 125 may experience a power interruption. The power interruption can be caused by various events, such as a fallen transmission line, a failed transformer, a centralized disconnect, etc. A power interruption can also occur if the end-device 125 is physically disconnected from the commodity delivery network 100. For example, an end-device 125 may be physically disconnected by maintenance personnel or may be physically disconnected by an unauthorized individual, such as someone attempting to tamper with the end-device 125.

When an end-device 125 is physically disconnected from the network 100, maintenance is typically required at the end-device 125 to physically reconnect the device 125 to the network 100. In contrast, if an end-device 125 experiences a power interruption but is not physically disconnected from the network 100, maintenance at the end-device 125 is typically not needed, and the end-device 125 resumes normal operation after the power interruption is corrected. Therefore, distinguishing between power interruptions caused by physical disconnections (hereinafter referred to as "disconnected interruptions") and power interruptions not caused by physical disconnections (hereinafter referred to as "connected interruptions") provides the commodity provider with important information regarding maintenance and end-device performance.

Figure 5:
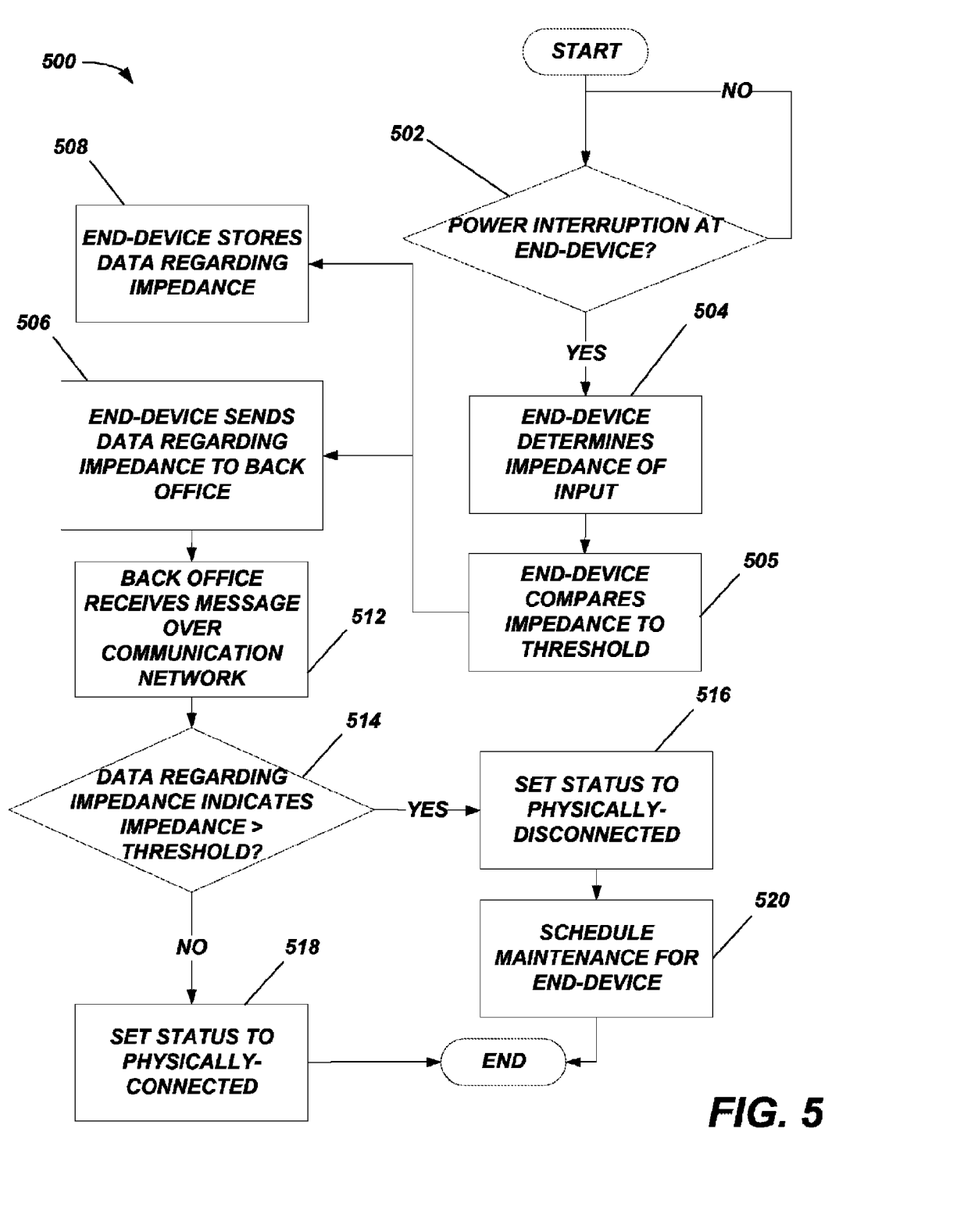
FIG. 5 is a flow chart illustrating a process for detecting when the end-device of FIG. 3 is physically disconnected from the commodity delivery network of FIG. 1.

FIG. 5 illustrates a process for detecting when an end-device 125 has been physically disconnected from the network 100. As shown in FIG. 5, the process 500 can include determining if the end-device 125 has experienced a power interruption (at 502). In some embodiments, the end-device 125 can include instructions for performing a "last gasp" process, which detects power interruptions and takes various actions in response to a detected power loss. For example, to assist the utility provider in determining the extent of a power interruption, the end-device 125 can send the back office 210 a "last gasp" message that indicates that the device has lost power, and may provide additional data regarding the power loss, such as a date and time. Alternatively or in addition, the end-device 125 can store data regarding the power loss to an internal memory (e.g., the computer-readable medium 314), which the end-device 125 or external devices or systems can access and analyze. Because the end-device 125 is no longer receiving power over the network 100, the end-device 125 can use the back-up power supply to perform the "last gasp" process.

If the end-device has experienced a power interruption (as detected during the "last gasp" process), the end-device 125 in the illustrated embodiment determines if it is physically disconnected from the commodity network 100. In particular, the end-device 125 can measure the impedance of the power input 301 using the back-up power supply (at 504). If the end-device 125 has been physically disconnected from the network 100, the power input 301 becomes an open circuit with infinite impedance. Therefore, if the end-device 125 detects "high" impedance on the power input 301, the end-device 125 is likely physically disconnected from the network 100. In contrast, if the end-device 125 detects "low" impedance on the power input 301, the end-device 125 is likely still physically connected to the network 100 but is experiencing a power loss. As noted above, when an end-device 125 is physically disconnected from the network 100, the power input 301 is an open circuit with an impedance that approaches infinity. However, in the situation when a meter is first physically disconnected from the network 100 with the load connected, the impedance of the power input 301 typically ranges from approximately 1.0 ohm to a couple hundred ohm. For example, for a representative load of 100 Amp, a "high" impedance can be approximately 2.4 ohms. Similarly, when the end-device 125 is not physically disconnected from the network 100, an expected "low" or normal impedance of the power input 301 can be approximately 0.12 ohms (using 5% as a representative network impedance for 25 kVA at 240 Vac).

In some embodiments, to determine the impedance of the power input 301, the end-device 125 transmits a test signal over the power input 301 and measures the amplitude of a response signal received over the power input 301. Low amplitude is associated with low impedance and high amplitude is associated with high impedance. The test signal transmitted by the end-device can have various forms and frequency. However, in most embodiments, the test signal can be formatted to make amplitude easily detectable. The test signal can include a pulse or a series of pulses, by way of example. In addition, the test signal can be adaptive. For example, the end-device 125 may be configured to listen to the power input 301 and then generate a test signal that is different from any signals heard or received over the power input 301, which makes detection and measurement of the response easier. Furthermore, in some embodiments, the end-device 125 can be configured to measure the impedance of multiple signals before a power interruption is detected, which provides an impedance baseline when the end-device 125 is physically connected to the network 100. The end-device 125 can then adapt the test signal based on the impedance baseline.

To perform the above measurements, in some embodiments, the end-device 125 includes a transmitting current transformer and a receiving current transformer. The test signal is applied to the transmitting current transformer, which is then detected by the receiving current transformer. The output of the receiving transformer is amplified and sent to an analog-to-digital converter to produce a measured impedance (or amplitude).

After determining the impedance (or amplitude) of the power input 301, the end-device 125 can determine if the measured impedance (or amplitude) is "low" or "high" by comparing the measured impedance (or amplitude) to a threshold (at 505). In some embodiments, the threshold is set to a normal or low impedance level for the power input 301 when the end-device 125 is physically connected to the network 100 (e.g., approximately 1.0 ohm).

After comparing the measured impedance (or amplitude) to the threshold, the end-device 125 can transmit data regarding the impedance to the back office 210 (at 506). As described above, in some embodiments, the end-device 125 includes the data regarding the impedance in a "last gasp" message transmitted to the back office 210 over the communication network 200. In other embodiments, the end-device 125 can transmit the data regarding the impedance to the back office 210 as a separate message. In either situation, the data regarding the impedance can include the result of comparing the measured impedance (or amplitude) to the threshold, an indication that the measured impedance (or amplitude) is greater than the threshold or is "high," an indication that the measured impedance (or amplitude) is not greater than the threshold or is "low" or "normal," the measured impedance (or amplitude), or any combination thereof. In some embodiments, if the end-device 125 determines that the measured impedance (or amplitude) is not greater than the threshold (e.g., is less than or equal to the threshold), the end-device 125 can be configured not to transmit any data regarding the impedance in the "last gasp." Therefore, the back office 210 can be configured to interpret the absence of data regarding the impedance as indicating that the measured impedance (or amplitude) was "low" or normal. As shown in FIG. 5, the end-device 125 can also store the data regarding the impedance or the "last gasp" message containing the data regarding the impedance to an internal memory (at 508), which allows the end-device 125 and/or external devices or systems to later access the data or message (e.g., when the end-device 125 regains power).

The back office 210 receives the message from the end-device 125 (at 512) and uses the data in the message to determine a status (e.g., "physically-connected" or "physically-disconnected") of the end-device 125. For example, the back office 210 can use the data contained in the message and an algorithm or look-up table to determine the status of the end-device 125 and/or the cause of the power interruption. For example, the back office 210 can be configured to use the data contained in the message (and data contained in the messages from other end-devices) to determine (i) if the end-device 125 has been physically disconnected from the network 100 and (ii) if not, what is or could be causing the power interruption experienced by the end-device 125.

In particular, the back office 210 can determine if the data regarding the impedance indicates that the measured impedance (or amplitude) is greater than the threshold (at 514). For example, if the data regarding the impedance included in the message indicates that the measured impedance (or amplitude) was "high" or greater than the threshold or otherwise indicates that the end-device 125 is physically disconnected from the network 100, the back office 210 sets the status of the end-device to "physically-disconnected" (at 516). Alternatively, if the data regarding the impedance included in the message indicates that the measured impedance (or amplitude) was low or not greater than the threshold (i.e., less than or equal to the threshold) or otherwise indicates that the end-device 125 is physically connected to the network 100 (which may be indicated by the absence of any data regarding the impedance in the "last gasp" message), the back office 210 sets the status of the end-device 125 to "physically-connected" (at 518).

If the status of an end-device 125 is set to "physically-disconnected," the back office 210 can transmit data to external devices or systems informing the devices or systems of the physical disconnection. In addition or alternatively, the back office 210 can schedule maintenance for the physically-disconnected end-device 125 (at 520), such as by scheduling an immediate visit to the end-device 125 by maintenance personnel. The back office 210 can schedule such a visit by sending a message, a page, a fax, an email, a text, etc. to maintenance personnel or to a system that manages end-device maintenance. The back office 210 can also store data about the detected physical disconnection, which the back office 210 or external devices or system can access and analyze. For example, the back office 210 can access the stored data to identify locations historically experiencing tampering or unauthorized physical disconnections.

It should be understood that the functions performed by the end-device 125 and the back office 215 can be combined and distributed in various configurations. For example, in some embodiments, the back office 210, rather than the end-device 125, can determine if the detected impedance (or amplitude) is "high" or "low." In particular, the end-device 125 can measure the impedance of the power input 301 and provide the measured impedance (or amplitude) to the back office 210 (e.g., in the "last gasp" message). The back office 210 can then compare the measured impedance (or amplitude) to the threshold and set the status of the end-device 125 based on the comparison. In particular, the back office 210 can automatically set the status of the end-device 125 to "physically-disconnected" if the measured impedance (or amplitude) transmitted by the end-device 125 is greater than the threshold. In some embodiments, the back office 210 also automatically sets the status of the end-device 125 to "physically-connected" if the measured impedance (or amplitude) transmitted by the end-device 125 is not greater than the threshold.

Various features and advantages of the invention are set forth in the following claims.

What is claimed is:

1. A computer-implemented method for managing an end-device connected to a commodity delivery network, the method comprising:
   determining, at the end-device, an impedance of a power input of the end-device after the end-device experiences a power interruption;
   generating, at the end-device, a message including data regarding the impedance;
   transmitting the message to a computer-implemented back office over at least one communication network; and
   automatically setting a status of the end-device to a physically-disconnected status when the data regarding the impedance indicates the impedance is greater than a threshold.

2. The method of claim 1, wherein determining the impedance further includes transmitting, at the end-device, a test signal over the power input, receiving a response to the test signal over the power input, and measuring an amplitude of the response.

3. The method of claim 2, wherein generating the message further includes generating a message including the amplitude of the response.

4. The method of claim 2, wherein determining the impedance further includes
   receiving, at the end-device, at least one signal over the power input, and
   generating, at the end-device, the test signal to be different than the at least one signal.

5. The method of claim 2, wherein generating the message further includes generating a message including a result of comparing the amplitude of the response to the threshold.

6. The method of claim 1, further comprising automatically, at the back office, scheduling maintenance for the end-device when the status of the end-device is set to the physically-disconnected status.

7. A system for managing a commodity delivery network, the system comprising:
   a computer-implemented back office; and
   an end-device including a back-up power source and at least one power input configured to be connected to the commodity delivery network, the end-device configured to detect a power interruption and, using the back-up power source, determine an impedance of the power input and transmit a message including data regarding the impedance to the back office over at least one communication network,
   the back office configured to receive the message and automatically set a status of the end-device to one of a physically-disconnected status and a physically-connected status based on the data regarding the impedance included in the message.

8. The system of claim 7, wherein the end-device is further configured to compare the impedance of the power input to a threshold and include a result of comparing the impedance of the power into to the threshold in the data regarding the impedance.

9. The system of claim 8, wherein the back office is further configured to automatically set the status of the end-device to the physically-disconnected status when the data regarding the impedance indicates the impedance of the power input is greater than the threshold and to automatically set the status of the end-device to physically-connected status when the data regarding the impedance indicates the impedance of the power input is not greater than the threshold.

10. The system of claim 7, wherein the end-device is further configured to transmit a test signal over the power input, to receive a response to the test signal over the power input, and to measure an amplitude of the response.

11. The system of claim 10, wherein the data regarding the impedance includes the amplitude of the response.

12. The system of claim 7, wherein the back office is further configured to automatically schedule maintenance for the end-device when the status of the end-device is set to the physically-disconnected status.

13. An end-device connected to a commodity delivery network, the end-device comprising:
  computer-readable medium containing instructions for managing the end-device; and
  a processor for executing the instructions, wherein the instructions include instructions for
    (i) detecting a power interruption,
    (ii) determining an impedance of a power input of the end-device,
    (iii) generating a message including data regarding the impedance of the power input, and
    (iv) transmitting the message over at least one communication network.

14. The end-device of claim 13, wherein the instructions further include instructions for
  generating a test signal,
  transmitting the test signal over the power input,
  receiving a response to the test signal over the power input,
  measuring an amplitude of the response, and
  including the amplitude in the data regarding the impedance.

15. The end-device of claim 14, wherein the instructions further include instructions for
  receiving at least one signal over the power input, and
  generating the test signal to be different than the at least one signal.

16. The end of claim 14, wherein the instructions further include instructions for determining a second impedance of the power input before the end-device detects a power interruption and generating the test signal based on the second impedance.

17. The end-device of claim 13, further comprising a backup power supply for supplying power to the processor after the end-device detects a power interruption.

18. The end-device of claim 13, wherein the instructions further include instructions for comparing the impedance of the power input to a threshold and including a result of comparing the impedance to the threshold in the data regarding the impedance.

19. A back-office for managing a commodity delivery network, the back-office comprising:
  computer-readable medium containing instructions for managing an end-device connected to the commodity delivery system; and
  a processor for executing the instructions, wherein the instructions include instructions for
    (i) receiving a message over at least one communication network from the end-device when the end-device experiences a power interruption, the message including data regarding an impedance of a power input of the end-device, and
    (ii) automatically setting a status of the end-device to a physically-disconnected status when the data regarding the impedance indicates the impedance is greater than a threshold.

20. The back-office of claim 19, wherein the instructions further include instructions for automatically scheduling maintenance for the end-device when the status of the end-device is set to physically-disconnected.

21. The back-office of claim 19, wherein the instructions further include instructions for automatically setting the status of the end-device to a physically-connected status when the data regarding the impedance indicates that the impedance is not greater than the threshold.

* * * * *